ntion is concerned with an improved grease having good extreme pressure, cohesive, and adhesive properties.

In brief compass, the grease composition of this invention comprises an oil-soluble amorphous polypropylene base having a molecular weight in the range of 300 to 10,000 and an intrinsic viscosity up to 0.4, 2 to 5 wt. percent of an isotactic polypropylene having a molecular weight in the range of 100,000 to 1,000,000 and a melting point in the range of 250° to 410° F., 5 and to 35 wt. percent of a soap-salt thickener. The grease has a penetration above 290 at 77° F. and a dropping point above 500° F.

In a much preferred embodiment of this invention, an oil—either a synthetic, mineral, animal or vegetable oil—replaces a major proportion of the amorphous polypropylene. Preferably, the composition contains at least 30 wt. percent of an oil. Enough amorphous polypropylene is used to assure compatibility between the isotactic polypropylene and the oil. Preferably, at least 10 parts by weight of amorphous polypropylene are used in the composition per part of isotactic polypropylene.

Isotactic polypropylene of high molecular weight, i.e., above 100,000, has recently been synthesized. The meaning of the term "isotactic" is brought out in an article in "The American Scientist," vol. 45, No. 1, January 1957, page 34. The molecular weights expressed for the polymeric materials used in this invention are according to the method described by Harris in the "Journal of Polymer Science," vol. VIII, 361, 1952. It has been appreciated that if this polymer were introduced into a grease, it would impart cohesiveness and adhesiveness. Such high molecular weight polymers are, however, generally oil-insoluble and it is difficult to introduce or to adequately disperse them in greases. These high polymers tend to form insoluble gels and can undesirably affect other characteristics of the greases. This is particularly true of greases thickened with soap-salt mixtures.

Greases have been marketed comprising primarily an oil base and a thickening amount of soaps and salts. When the soap-salt mixture is prepared at temperatures above 430° F., it forms a complex. Grease containing soap-salt complexes have very good extreme pressure properties and are generally considered as multi-purpose greases. These soap-salt complexes are well known to the art, and consist of the salts of low molecular weight carboxylic acids, usually calcium acetate, with metal soaps of higher molecular weight fatty acids. The salt to soap ratio used is usually in the range of 3:1 to 40:1, and usually about 10 to 30 wt. percent of the complex is used to thicken the oil.

This invention is based on the discovery that high molecular weight isotactic polypropylenes can be satisfactorily incorporated in a grease containing mixed salts of high and low molecular weight organic acids, through the agency of an oil-soluble amorphous polypropylene of select molecular weight. According to this invention, an unctuous uniform product is obtained having good adhesiveness, stringiness, and splatter-resistance, besides extreme pressure and anti-wear properties. It is resistant to structural breakdown even under high shearing stresses.

In a prepared embodiment of this invention, when the isotactic polypropylene, amorphous polypropylene, soap and salt mixture is used to thicken an oil, unexpected advantages are obtained. Whereas unsuccessful attempts have been made in the past to combine isotactic polypropylene with oils, it has now been found that by the use of amorphous polypropylene of select molecular weight, the isotactic polypropylene is successfully made to blend with the oil. Because of the presence of the isotactic polypropylene in the finished grease, it has extremely good adhesiveness even to wet surfaces.

The greases of this invention are particularly useful for lubricating open gears and shackles, as in automobiles, which are subjected to reciprocating shock action.

The isotactic polypropylene and the amorphous polypropylene can conveniently be prepared by polymerizing propylene in the presence of a catalyst, which broadly stated, is a mixture of a reducing agent and a reducible metal compound, better known to the art as an alkyl metal catalyst. The catalyst mixture will generally contain a molar ratio of 1 to 12 moles of reducing agent per mole of the reducible metal compound. Reducing agents which can be used include alkali and alkaline earth metals, their hydrides and alloys, aluminum compounds such as aluminum hydrides, metallo-organo compounds such as aluminum alkyls, trialkyls, alkyl aluminum halides, etc. Aluminum compounds are particularly preferred and specific examples are aluminum triethyl, aluminum trimethyl, aluminum triisopropyl, aluminum diethylbromide, aluminum diethylchloride, aluminum diphenylchloride, aluminum hydride, ethyl aluminum dihydride and ethoxy aluminum diethyl. The preferred aluminum compounds are (1) dialkyl aluminum monohalides containing about 2 to 4 carbon atoms in the alkyl groups, and chlorine or bromine atoms; and (2) aluminum trialkyls containing about 2 to 4 carbon atoms in the alkyl group.

Reducible heavy metal compounds which can be used include halides; acetyl acetonates, etc. of heavy metals of groups III–B, IV–B, V–B, and VI–B of the periodic system as shown on pages 58–59 of Lange's "Handbook of Chemistry," 7th edition, 1949. Examples of such metals include hafnium, thorium, uranium, vanadium, chromium, molybdenum and particularly titanium and zirconium. Titanium salts are particularly preferred for the reducible metal compound. Examples are titanium tetrachloride, titanium oxychloride, and titanium acetyl acetonate.

The polymerization can be carried out under pressures of 0 to 1000 p.s.i.g., at temperatures in the range of 0° C. to 100° C., and for about ½ to 50 hours. The reaction is preferably carried out in the presence of an inert liquid diluent such as aliphatic hydrocarbons including pentane, hexane, heptane, decane and aliphatic petroleum fractions, alicyclic hydrocarbons such as cyclohexane and methylcyclohexane; aromatics such as toluene and xylene and chlorinated aromatics such as chlorobenzene. The amount of catalyst used is generally 0.1 to 3 wt. percent, based on diluent. The amount of diluent used is such that the final concentration of the polypropylene in the reaction product is about 10 to 30 wt. percent, based on total weight of diluent, catalyst and polypropylene. Upon completion of the polymerization, an oxygenated material such as acetone or a $C_1$ to $C_4$ alkanol can be added to solubilize the catalyst and quench the reaction. The insoluble portion of the polypropylene, i.e., the isotactic polymer, is then removed by filtration or centrifuging and the soluble portion is removed by stripping.

The isotactic polypropylene used in this invention has a molecular weight in the range of 100,000 to 1,000,000 and has a melting point above 250° F. It is largely insoluble in organic solvents, i.e., less than 10 wt. percent of it is taken up by normal heptane at 130° F. The amorphous polypropylene used has a molecular weight in the range of 300 to 10,000, and has an intrinsic viscosity up to 0.4 as determined in tetralin at 135° C. It is oil-soluble, i.e., it is freely soluble in normal heptane at temperatures above 130° F.

The polypropylenes produced with alkyl metal catalyst are preferred for use in accordance with this invention. If a solid polypropylene is obtained that has not been naturally separated into amorphous and crystalline form during manufacture, then it can be separated by simple extraction with a suitable solvent such as normally liquid aliphatic hydrocarbon solvents. The separation is necessary because the ratio of amorphous to isotactic material, and the molecular weights, in conventionally produced solid polypropylenes are generally improper for obtaining the desired grease of this invention.

The greases of this invention are prepared with conventional salt-forming low molecular weight carboxylic acids, conventional soap-forming high molecular weight carboxylic acids, and conventional lubricating oils such as mineral, synthetic, animal, and vegetable oils.

The high molecular weight carboxylic acids useful for the purposes of the present invention are the soap-forming acids and include those having about 8 through 30 carbon atoms per molecule. Those having about 8 to 20 carbon atoms per molecule are particularly preferred. When the soap has a chain length greater than 14 carbon atoms, then preferably a portion of the soap is formed from a hydroxy acid.

The acids can be derived from saturated or unsaturated naturally occurring or synthetic fatty materials. Examples of suitable acids include caprylic, lauric, stearic, hydroxy stearic, dihydroxy stearic, arachidic, hydrogenated fish oil and tallow acids, etc. Unsaturated acids, such as oleic, ricinoleic, and similar acids can likewise be used.

The acids obtained from coconut fatty oils are most preferred. These coconut fatty acids have, usually, an average molecular weight of about 172, i.e., a $C_{10}$ chain length.

Suitable low molecular weight acids include saturated and unsaturated aliphatic mono- and polycarboxylic acids having from 1 through 6 carbon atoms, such as formic, acetic, propionic, furoic, acrylic, adipic, and similar acids including their hydroxy derivatives such as lactic acid. Acetic acid is particularly preferred. Mixtures of these acids can, of course, be employed.

The metal component of the complex thickeners of this invention can be any grease-forming metal, but is preferably an alkaline earth metal such as calcium, strontium, barium and magnesium, the preferred metal being calcium. Mixtures of these metals can be employed if desired.

The lubricating oil used has a viscosity in the range of 35 to 150 SSU at 210° F., and a viscosity index (V.I.) in the range of 40 to 140.

Straight mineral lubricating oils or distillates derived from paraffinic, naphthenic, asphaltic, or mixed base crudes, or if desired, various blended oils, can be employed as well as residuals, particularly those from which asphaltic constituents have been carefully removed. The oils can be refined by conventional methods using acid, alkali and/or clay or other agents such as aluminum chloride; or they may be extracted oils produced, for example, by solvent extraction with solvents of the type of phenol, sulfur dioxide, furfural, dichlorodiethyl ether, nitrobenzene, crotonaldehyde, etc. Hydrogenated oils, white oils, or shale oil can be employed as well as synthetic oils such as those prepared, for example, by the polymerization of olefins or by the reaction of oxides of carbon with hydrogen, or by the hydrogenation of coal or its products. Also, for special applications, animal, vegetable or fish oils, or their hydrogenated or voltolized products, can be employed alone or in admixture with mineral oils. Useful synthetic lubricating oils include esters of dibasic acids, e.g., di-2-ethyl hexyl sebacate; esters of glycols, e.g., $C_{13}$ Oxo acid diester of tetraethylene glycol; complex esters, e.g., the complex ester formed by reacting one mole of sebacic acid with two moles of tetraethylene glycol and two moles of 2-ethyl hexanoic acid, etc.

In addition to the material to be added according to the present invention, other agents can also be used such as dyes, heat thickened fatty oils, sulfurized fatty oils, organo-metallic compounds, anti-oxidants, other thickeners, viscosity index improvers, oiliness agents, resins, rubber other olefin polymers, voltolized fats, voltolized mineral oils, and/or voltolized waxes, colloidal solids such as graphite or zinc oxide, etc. Solvents and assisting agents, such as esters, ketones, alcohols, aldehydes, halogenated or nitrated compounds, and the like, can also be employed.

In formulating the greases, it is preferred to first add the amorphous polymer to the isotactic polymer, followed by heating to a temperature above 300° F., and then to form a homogeneous dispersion of the soaps and salts therein followed by heating to a temperature above about 450° F. to form a soap-salt complex. The organic acid soaps and salts can be preformed and then added to the polypropylene mixture, and in cases where the polypropylene mixture is to be used to thicken a mineral oil, the soap and salt can be formed in the oil. In some cases the complex soap-salt mixture can be formed in the amorphous polypropylene, followed by addition of the isotactic polypropylene and heating to above 450° F. to disperse the isotactic polypropylene and form the complex soap. In cases, however, where it is desired not to dehydrate the mixture, the isotactic polypropylene must first be dispersed in the amorphous polypropylene at above 300° F., followed by cooling and forming of the soaps and salts in situ without heating above 200° F.

The following examples will serve to make this invention clear.

The amorphous polypropylene was prepared by mixing 20 ml. of 0.84 molar titanium tetrachloride with 20 ml. of 0.88 molar aluminum alkyl (25% aluminum triethyl, 75% aluminum diethyl) chloride in normal heptane, and diluting to 250 ml. with normal heptane. This mixture was charged to a stainless steel reactor. Approximately 200 grams of cold liquid propylene were passed into the reactor under nitrogen at a gauge pressure of 500 p.s.i. The reactor was then heated to 200° C. for a period of three hours, the pressure passing through a maximum of 895 p.s.i.g. The reactor was then cooled to room temperature and vented. The product was transferred to a vessel containing two liters of ethyl ether and was thoroughly mixed with ether. The solid which settled out was removed by filtration and was dried. It was a white solid that had a mol. wt. of about 50,000 and was 40–50% insoluble in hot heptane. This solid for the purposes of this example, was discarded. The ether solution was concentrated to yield a light colored oil having the following viscosities:

1013 SSU at 100° F.
70 SSU at 210° F.

This was the amorphous polypropylene that was used in Examples I and II.

In preparing the isotactic polypropylene, the catalyst consisted of 0.6 gram of $TiCl_3$ and 9 ml. of 0.88 molar solution of $AlEt_3$ in heptane. The $TiCl_3$ was prepared by Ti powder reduction of $TiCl_4$ at 450° C. and was ground to a fine powder before use.

The reaction was carried out in a manner similar to that used to prepare the amorphous polymer. The reaction temperature was 80° C. and the maximum pressure 500 p.s.i.g. 180 grams of solid polymer and 1.9 grams of oil were obtained by adding excess isopropanol to the reaction product, filtering and evaporating the solvents. The solid polymer was characterized as follows:

| | |
|---|---|
| Mol. wt.×10$^{-3}$ (Harris) | 169 |
| Melt index | .264 |
| S.P./M.P.,° C. | 158/163 |
| Tensile, p.s.i. | 3480 |
| Elongation, percent | 200 |
| Specific gravity | .888 |
| Modulus of rigidity, 250° C., p.s.i.×10$^{-5}$ | 0.64 |
| Percent insoluble in hot heptane | 74 |
| Mol. wt.×10$^{-3}$ (Harris) of heptane insoluble portion | 220 |
| Mol. wt.×10$^{-3}$ (Harris) of heptane soluble portion | 32 |

The heptane insoluble portion was used to prepare the greases in the Examples I and II.

*Example 1*

A grease was made up having the following formulation:

12% glacial acetic acid
6% coconut fatty acids (Wecoline AAC acids)[1]
9.8% hydrated lime
1.0% phenyl alpha naphthylamine
3.0% isotactic polypropylene
68.2% amorphous polypropylene

[1] The coconut fatty acids are commercially available acids having the following composition:
   26% caprylic acid
   57% capric acid
   17% lauric acid The lime, isotactic polypropylene and amorphous polypropylene were charged to a fire-heated kettle and intimately mixed without external heating. A blend of the coconut fatty acid and acetic acid was added during the mixing. The temperature rose to 180° F. and stirring was continued for ½ hour. External heating was then initiated and the temperature was raised to 440° F., taking approximately three hours. Heating was discontinued and the grease was cooled rapidly to 200° F. The phenyl alpha naphthylamine inhibitor was added, the product was homogenized in a Gaulin homogenizer at 500 p.s.i.g. and packaged. The grease had the following properties:

| | |
|---|---|
| Appearance | Excellent. |
| Dropping point, ° F. | 500+. |
| Penetrations, 77° F., mm./10: | |
|   Unworked | 250. |
|   Worked 60 strokes | 275. |
|   Worked 10,00 strokes | 300. |
| Splatter test | Did not splatter. |
| String test | 5 inches. |
| Norma Hoffmann oxidation, hours to 5 p.s.i. drop | 400+. |
| Lubrication hours, NFGI–AFBMA machine test: 80° F. / 150° F. / 250° F. | Excellent—Does not throw out of bearing or thin out, or otherwise leak through the bearing seal. |
| Lubrication life hours, 10,000 r.p.m., 250° F. | 2000+. |
| 4-ball wear test scar spot diameter, mm. (1800 r.p.m., 10 kg. load, 75° C., 1 hr.) | 0.24. |
| Timken test, OK load | 50 lbs., narrow scar. |
| Oil separation | None over long periods of storage. |
| Shell roller test (4 hrs. at 77° F.): | |
|   Initial micro penetration, 77° F., mm./10 | 155. |
|   Final | 154. |
|   Percent change | 0.64. |

The splatter test is carried out by dropping a flat 150 gram hammer head, on which 5 grams of the test grease had been spread, on an anvil, from a height of 24 inches. The impact will cause the grease to splatter over considerable distance if it is not sufficiently adhesive and cohesive. The splatter is measured from the point of impact. A splatter of less than three inches is considered excellent. Generally, if the grease is not retained in a three inch circle, the grease splatters over a considerable distance.

The stringiness of the grease was determined by placing the 5 gram sample grease on the face of the hammer, and contacting the hammer with the anvil. The hammer was then slowly raised until the string stretched out and broke. The length of the string was measured from the breaking point to the anvil.

*Example 2*

A grease was prepared using a mineral lubricating oil. The oil was admixed with the polypropylenes and the grease was prepared in a manner similar to that to Example 1. The grease had the following composition:

12.0% glacial acetic acid
6.0% coconut fatty acids (as in Example 1)
9.8% hydrated lime
1.0% phenyl α naphthylamine
1.0% isotactic polypropylene
10.0% amorphous polypropylene
60.2% Coastal type mineral oil (vis./100:500—V.I.: 45)

Properties:

| | |
|---|---|
| Appearance | Excellent smooth homogeneous product. |
| Dropping point, °F. | 500+. |
| Penetrations 77° F., mm./10: | |
|   Unworked | 260. |
|   Worked, 60 strokes | 285. |
|   Worked, 10,000 strokes | 283. |
| Splatter test | Did not splatter. |
| String test | 6 inches. |
| Shell roller test, 4 hours at 77° F., penetration micro, 77° F., mm./10: | |
|   Initial | 150. |
|   Final | 155. |
|   Percent charge | 3.3. |
| 4 ball wear test scar spot diam., mm. | 0.22. |
| Timken test, OK load | 45 narrow scar. |

*Example 3*

A grease was made up having the following composition:

6.0% glacial acetic acid
1.5% stearic acid
1.5% hydroxystearic acid
4.5% hydrated lime
1.0% phenothiazine
1.0% isotactic polypropylene, about 250,000 mol. wt.
34.5% amorphous hexane soluble polypropylene, about 10,000 mol. wt.
50.0% di-2-ethyl hexyl sebacate It was prepared in a manner similar to the preparation described in Example 1, the synthetic oil being initially admixed with the polypropylenes. The grease had the following properties:

| | |
|---|---|
| Appearance | Excellent smooth uniform grease. |
| Dropping point, °F. | 500+. |
| Penetrations, 77° F., mm./10: | |
|   Unworked | 300. |
|   Worked, 60 strokes | 310. |
|   Worked, 100,000 strokes | 311. |
| Low temperature performance, —40° F. | Excellent. |
| Lubricating life hours (10,000 r.p.m. 250° F.) | 2000+. |

Example 4

A grease was prepared with a soap-salt mixture that was not complexed by heating to a high temperature. One part of isotactic polypropylene of about 500,000 molecular weight was dissolved in 68.2 parts of amorphous polypropylene of about 500 molecular weight, by heating and stirring at 300° F. This dispersion was allowed to cool to approximately 100° F. A grease having the following composition was prepared from this dispersion:

8.0% glacial acetic acid
4.0% coconut fatty acids (as in Example 1)
6.5% hydrated lime
1.0% phenyl alpha naphthylamine
80.5% dispersion of crystalline polypropylene in amorphous polypropylene The grease was prepared in a manner similar to that described in Example 1 and had the following properties:

| | |
|---|---|
| Appearance | Excellent. |
| Dropping point, °F | 500° F. |
| Penetrations, 77° F., mm./10: | |
| Unworked | 300. |
| Worked, 60 strokes | 310. |
| Worked, 100,000 strokes | 320. |
| Adhesiveness to metal surfaces | Excellent. |
| Splatter | None. |
| Stringiness | 5 inches. |

Comparative Example 1

A formulation was made up similar to Example 1, except that a 500 SSU at 210° F. viscosity pale oil replaced the amorphous polymer. Even at the elevated temperatures employed in the complexing of the grease, i.e., 460° F., all of the isotactic polymer was not completely and uniformly dispersed in the finished product. Undesirable pieces of gelatinous viscous polymer spread throughout the mixture. This material could not be filtered out easily because of filter clogging.

Comparative Example 2

A preparation was made up in a manner similar to that of Example 1, except that a 500 S.S.U. viscosity at 100° F. lubricating oil, formed from the thermal polymerization of polypropylene at 315–400° C., under 3500–6000 p.s.i.g., was used in place of the amorphous polymer. This thermally formed polymer had an approximate molecular weight of 800 and had a V.I. of about 100. The same method of manufacture as used for the grease in Example 1 was employed. The grease obtained had the following properties as compared to the grease of Example 1.

| | Grease of Example 1 | Grease of Comparative Example 2 |
|---|---|---|
| Appearance | Excellent | Excellent. |
| Dropping Point, °F | 500+ | |
| Penetrations, 77° F., mm./10: | | |
| Unworked | 250 | 340. |
| Worked 60 strokes | 275 | 390. |
| Worked 10,000 strokes | 300 | Fluidized. |
| Splatter Test | Does not splatter | Splatters badly. |
| String Test | 5 inches | ½ inch. |
| Adhesiveness to dry metal surfaces | Good | Poor. |
| Adhesiveness to wet metal surfaces | do | Do. |

These data show that greases having good adhesiveness to metal surfaces, non-splatter properties, and excellent structure stability, cannot be prepared in high viscosity index polymer oils without the presence of isotactic polypropylene.

Comparative Example 3

A grease was prepared in a manner similar to that of Example 1 having the following composition:

8.0% glacial acetic acid
2.0% 12-hydroxy stearic acid
2.0% stearic acid
6.4% hydrated lime
81.6% hydrofined Coastal oil, 510 S.S.U. vis. at 210° F.

The grease had the following properties:

| | |
|---|---|
| Appearance | Smooth uniform buttery grease. |
| Dropping point, °F | 500+. |
| Penetrations, 77° F., mm./10: | |
| Worked, 60 strokes | 285. |
| Worked, 100,000 strokes | 340. |
| Stringiness | None. |
| Adhesiveness to dry metal surfaces | Fair. |
| Adhesiveness to wet metal surfaces | Will not adhere. |
| Splatter | Splatters over wide area. |
| Oil separation | Fairly heavy on long storage. |

Note in the above data the poor structural stability of the grease due to the absence of a polymer.

Comparative Example 4

A grease was made up as follows:

9% of an amorphous polypropylene having a molecular weight of about 800 and 1% of an isotactic polypropylene having a molecular weight of about 500,000, were dispersed in 90% of a hydrofined Coastal oil (S.S.U. vis./100° F. of 510 and a V.I. of 46) by heating and stirring for ½ hour at 300° F. The mixture was cooled and formed an excellent, stringy, adhesive, non-splattering grease. It had a dropping point, however, of only 250° F. and its extreme pressure properties were poor. In the Almen test, it carried only four weights, and in the Timken test it failed at 15 lb. load and gave a broad scar.

In the Shell 4-ball wear test, the scar spot diameter was 0.65.

Having described this invention what is sought to be protected by Letters Patent is succinctly set forth in the following claims.

What is claimed is:

1. A grease composition having a penetration above 290 at 77° F. and a dropping point above 500° F. comprising an oil-soluble amorphous polypropylene having a molecular weight in the range of 300 to 10,000 and an intrinsic viscosity up to 0.4, 2 to 5 wt. percent of an isotactic polypropylene having a molecular weight in the range of 100,000 to 1,000,000 and a melting point in the range of 250° to 410° F., and 5 to 35 wt. percent of a soap-salt thickener and wherein the amount of said amorphous polypropylene is sufficient to disperse said isotactic polypropylene.

2. The composition of claim 1 comprising in addition at least 30 wt. percent of a lubricating oil having a viscosity in the range of 35 to 150 S.S.U. at 210° F. and a viscosity index in the range of 40 to 140, and wherein the ratio, by weight, of amorphous to isotactic polypropylene is at least 10/1.

3. The composition of claim 1 wherein said salt is of a carboxylic acid having from 1 through 6 carbon atoms, wherein said soap is of a carboxylic acid having from 8 through 30 carbon atoms, wherein the ratio of salt to soap is in the range of 3:1 to 40:1 and wherein said soap and salt have been heated above 430° F. to form a complex.

4. A process which comprises heating an admixture comprising 2 to 5 wt. percent, based on final composition, of an isotactic polypropylene having a molecular weight in the range of 100,000 to 1,000,000 and a melting point in the range of 250° to 410° F.; an amorphous polypropylene having a molecular weight in the range of 300 to 10,000, the weight ratio of amorphous to isotactic polypropylene being at least 10/1; and the metal soap of a $C_8$ to $C_{30}$ carboxylic acid and the salt of a $C_1$ to $C_6$ carboxylic acid, the ratio of said salt to said soap being in the range of 3:1 to 40:1, and the combined weights of said soap and salt amounting to 5 to 35 wt. percent, based on final composition, to a temperature above 430° F. and cooling the admixture to attain a grease structure having a penetration above 290 at 77° F. and a dropping point above 500° F.

References Cited in the file of this patent

UNITED STATES PATENTS

| | | |
|---|---|---|
| 2,526,986 | Whitney | Oct. 24, 1950 |
| 2,810,695 | Young et al. | Oct. 22, 1957 |

OTHER REFERENCES

American Scientist, vol. 45, No. 1, pp. 34–43 (1957).